Patented May 15, 1951

2,552,510

UNITED STATES PATENT OFFICE 2,552,510

LUBRICANT CONTAINING ETHERS WITH MULTIPLE SULFUR OR LIKE LINKAGES

George E. Barker and George E. Alter, Jr., Pittsburgh, Pa., assignors to Elgin National Watch Company, Elgin, Ill., a corporation of Illinois No Drawing. Application September 5, 1944, Serial No. 552,814

3 Claims. (Cl. 252—45)

It has now been found that valuable lubricants, having physical and chemical properties which fit them for service where atmospheric and other influences tend to deprive prior lubricants of their desirable attributes or cause them to leave the point of use, or to cause attack upon contacting surfaces, are demonstrated by organic compounds containing three divalent sulfur atoms separated from one another by one or more carbon atoms, or, more specifically, of the general formula R—S—$C_mH_{2m}$—S—$C_nH_{2n}$—S—R' where R and R' are hydrogen-carbon radicals containing 1 to 24 carbon atoms, and the subscripts $m,n$ of the inner groups are integers 1 to 7; at least a total of 10 carbon atoms should be present in the compound and, for fluid lubricants for instruments and small machines, not more than about 35 total carbon atoms should be present. The lubricant preferably is present in the form of a mixture of isomers or homologs whereby a low melting point is exhibited. It is presently preferred to have the inner groups with 2 or 3 carbon atoms (i. e. $m$ and $n$ are the integers 2 and 3); and to have R and R' contain 5 or more carbon atoms each (amyl, benzyl and higher groups).

These compounds may be designated as ethers having multiple thio- and seleno-linkages. They can be prepared in various ways, such as the following:

I.—Preparation of diamyldithio-dipropyl sulfide from trimethylene chlorohydrin A solution of 440 grams of sodium hydroxide in 2000 cc. of water was agitated with 1144 grams of mixed amyl mercaptans and was heated until the mixture began to reflux. Heating was then discontinued, and 940 grams of trimethylene chlorohydrin were slowly run into the vigorously agitated mixture. When the heat of reaction had subsided, external heating was resumed, and the reaction mixture was stirred and maintained at refluxing temperature overnight. The material was then cooled and separated, and the aqueous layer was discarded. The oily layer was washed once with an excess of dilute hydrochloric acid, and was then washed several times with water until the final wash waters were found to be practically neutral. After having been dried over anhydrous sodium sulfate, this oil was distilled. There were obtained 1417 grams of amylthiopropanol which distilled at a temperature of 120–125° C. under a pressure of approximately 10 millimeters of mercury.

The amylthiopropanol prepared above was placed in a water-cooled container and was saturated with hydrogen chloride by bubbling the gas through the liquid. Then, while the alcohol was stirred and the addition of hydrogen chloride was continued, 412 grams of phosphorus trichloride were slowly run into the solution. During this addition the temperature of the mixture was held below 25° C., but upon completion of the phosphorus trichloride addition, the water-cooling was discontinued and the mixture was heated to 90° C. and held there with continued stirring for four hours. The material was then cooled, and 100 cc. of water were added, whereupon the mixture separated into three layers. The lower, heavy layer, which was miscible with water, was drawn off and discarded. The intermediate layer, of comparatively small volume, was also discarded. The upper layer was washed with successive portions of water till it was neutral, and was then dried over anhydrous sodium sulfate and distilled. There were obtained 830 grams of amylthiopropyl chloride which distilled between 105 and 120° C. at a pressure of approximately 20 millimeters of mercury. This material was determined by analysis to contain 17.5 percent sulfur and 22.5 percent chlorine, as compared to the theoretical values of 16.8 percent sulfur and 18.7 percent chlorine.

The 830 grams of amylthiopropyl chloride were slowly added to a refluxing solution of 625 grams of crystalline sodium sulfide ($Na_2S.9H_2O$) dissolved in a mixture of 2000 cc. of methanol and 1000 cc. of water. The reaction mixture was then stirred and refluxed overnight. The methanol was subsequently removed by distillation over a steam bath; and the residual material was cooled and separated, the aqueous layer being drawn off and discarded. The oily layer was then washed once with dilute hydrochloric acid and several times with successive portions of water until the final wash waters were found to be neutral. The oil was then dried over anhydrous sodium sulfate, and was distilled. There were obtained 514 grams of diamyldithiodipropyl sulfide which distilled between 190 and 210° C. at a pressure of approximately 2 millimeters of mercury.

In order to remove the last traces of corrosive impurities from this material, it was agitated for two hours with 150 cc. of a 5 percent solution of cupric chloride. The aqueous solution was then drawn off and discarded, and the oil was filtered, washed once with fresh water, and agitated with a saturated aqueous solution of hydrogen sulfide for two hours. Once again the aqueous layer was separated and discarded and the purified oil was filtered, dried and redistilled in vacuo.

II.—Preparation of diamyldithio-dipropyl sulfide from trimethylene chlorobromide 1890 grams of trimethylene chlorobromide, 1380 grams of mixed amyl mercaptans, 3000 cc. of methyl alcohol, and 1500 cc. of water were agitated together and heated until the mixture began to reflux. Heating was then discontinued, and there was slowly added a solution of 480 grams of sodium hydroxide in 3000 cc. of water. After the addition of the caustic had been completed, heating was resumed; and the material was refluxed with stirring for four hours. Then the methanol was evaporated away from the mixture, and the residual material was separated. The aqueous layer was discarded. The oily layer was washed once with dilute hydrochloric acid and several times with successive portions of water until the wash waters were found to be neutral. The oil was then dried over anhydrous sodium sulfate and distilled yielding 1820 grams of amylthiopropyl chloride which distilled between 110 and 115° C. at a pressure of approximately 15 millimeters of mercury.

These 1820 grams of amylthiopropyl chloride were added slowly with stirring to a refluxing mixture containing 1200 grams of sodium sulfide ($Na_2S.9H_2O$), 2500 cc. of water, and 2000 cc. of isopropanol. The mixture, after the addition of the chloride, was then stirred and refluxed overnight, after which the isopropanol was removed by distillation. The residual material was made slightly acid by the addition of dilute hydrochloric acid, and was washed with successive portions of water till neutral. After the last portion of wash water had been separated and discarded, the oil was shaken with one-third of its volume of a 5 percent aqueous solution of cupric chloride. The copper solution was then separated and discarded, and the oil was filtered, washed twice with fresh water, and agitated for two hours with a saturated aqueous solution of hydrogen sulfide. Following this treatment the oil layer was again filtered and washed. The oil was then dried over anhydrous sodium sulfate and distilled. There were recovered 1004 grams of unchanged amylthiopropyl chloride, and 425 grams of diamyldithiopropyl sulfide which distilled at 205–210° C. at a pressure of approximately 2 millimeters of mercury.

III.—Preparation of diamyldithio-dipropyl selenide

Approximately 118 grams (0.75 mole) of potassium selenide (Organic Syntheses, vol. 18, p. 27, John Wiley & Sons, N. Y.) was dissolved in 1.5 liters of 95 percent ethyl alcohol. This mixture was heated to reflux while 270 grams (1.5 mole) of amylthiopropyl chloride (preparation by either of above processes) was added during the course of one half hour. The refluxing was continued by heating on the steam bath for an additional two hours. When cool, the mixture was filtered and the alcohol was removed by distillation under reduced pressure. The residue, a red oil, was washed with dilute hydrochloric acid, and subjected to the conditions of steam distillation to remove impurities. The oil itself did not distill, but a black sludge separated and was removed by filtration. The oil was dried over anhydrous sodium sulfate and treated with decolorizing carbon before filtration. The product was a red oil which has a viscosity of 10.6 (centistokes) at 100° F. and 53.0 at 32° F. It does not oxidize at 212° F. during 100 hours in the presence of brass nor does it cause the corrosion of brass or steel.

Compounds having the R or R' groups of higher carbon number than amyl can be prepared by substituting the corresponding mercaptans. Compounds having aryl radicals in the R or R' groups may be prepared by substituting benzyl or other mercaptans. Similarly, the number of carbons in the intermediate groups (that is, the integer value of $m$ and $n$) may be controlled by employing other than trimethylene compounds in provoking the thio-ether formation from the mercaptans; e. g., ethylene chlorohydrin or ethylene chlorobromide is employed to form substituted diethyl sulfides etc., and pentamethylene chlorohydrin or pentamethylene chlorobromide to form substituted diamyl sulfides etc. The compounds need not be symmetrical: e. g. by using the above general procedures, di - chloropropyl - sulfide ($Cl.C_3H_6.S.C_3H_6.Cl$) is prepared and then reacted in equimolecular quantity with amyl mercaptans ($C_5H_{11}.SH$) to obtain amylthiopropyl-chloropropyl sulfide ($C_5H_{11}.S.C_3H_6.S.C_3H_6.Cl$), and this is further reacted in equimolecular quantities with tetracosane mercaptans ($C_{24}H_{49}.SH$) to form the unsymmetrical tetracosanylthiopropyl-amylthiopropyl sulfide ($C_{24}H_{49}.S.C_3H_6.S.C_3H_6.S.C_5H_{11}$).

Examples of practice are:

Example I

Diamyldithiodipropyl sulfide,

has a viscosity of 6.5 (centistokes) at 100 degrees F. and 23.3 at 32 degrees F., cloud point below minus 100 degrees F.; pour point minus 100 degrees F.; no corrosion upon brass, slight discoloration on steel after 4 days; surface tension 34.9 dynes per centimeter.

Example II

B-amylthio-B'-benzylthiodiethyl sulfide, and B-amylthio-B'-benzylthiodipropyl sulfide have corresponding properties; along with a high contact angle upon brass, steel and ruby, so that they are non-spreading thereon.

Example III

Diamyldithiodiethyl sulfide,

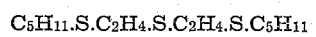

has a viscosity (centistokes) of 5.4 at 100 degrees F. and 118.8 at 32 degrees F.; a cloud point of minus 20 degrees F.; a pour point of minus 20 degrees F. (crystallizes); no corrosion upon brass or steel; surface tension of 34.3 dynes per centimeter.

Example IV 100 parts by weight of diamyldithiodipropyl sulfide, 0.20 part of dodecylpiperidine stearate as an oiliness agent, 0.10 part of tertiary butyl catechol as an anti-oxidant, and 1.00 part of polystyrene (the material sold commercially with a molecular weight around 20,000 has been found successful), to improve the viscosity-temperature relationship, form a mixture having a viscosity (centistokes) of 12.8 at 100 degrees F. and 46.3 at 32 degrees F.; cloud point below minus 100 degrees F.; pour point minus 100 degrees F.; very slight discoloration on brass, staining after 20 days on steel; 98 percent remained upon evaporation test of 100 hours at 70 degrees C. with ½ cubic feet nitrogen per hour passing through 1 gram sample.

The sulphur atoms providing the links in the compounds may be replaced at one or more points by selenium atoms. The terminal groups R and R' may have side chains if aliphatic, or substitution groups if aromatic. A ketone or ether side group on an aliphatic chain, for example, is satisfactory: and nitrogen may be included as a tertiary amino group, $$-N^X_{X'}$$

where X and X' are alkyl groups, aryl groups, or aralkyl groups, which may be connected to provide a ring structure. The inner groups ($C_mH_{2m}$ and $C_nH_{2n}$) may have side chains, such as in diamyldithiodiisopropyl sulfide, $$C_5H_{11}.S.CH_2.CH(CH_3).S.CH(CH_3).CH_2.S.C_5H_{11}$$

a compound similar in action to the above but not having so flat a viscosity-temperature curve.

When the end or R, R' groups contain at least one aryl radical, the contact angle upon brass, steel and ruby is high and the compounds are non-spreading.

Further, the desire for lubricants of very low melting point can be satisfied by mixing one or more compounds of the above type, as well as by providing each type in the form of isomers as exemplified by the employment of mixed amyl mercaptans above.

It is obvious that the invention is not limited to the specific examples of practice, but may be employed in many ways within the scope of the appended claims.

What we claim is:

1. A lubricant consisting predominantly of 100 parts of diamyldithiodipropyl sulfide, and also containing substantially 0.20 part of dodecylpiperidine stearate, substantially 0.10 part of tertiary butyl catechol, and 1.0 part of polystyrene.

2. A lubricant in which the lubricating base is diamyl-dithio-dialkyl sulfides as a mixture of isomers, the said alkyl groups having a chain of 2 to 7 carbon atoms, said lubricant being characterized in having a viscosity at 100° F. of substantially 6.5 to 12.8 centistokes, a viscosity at 32° F. of substantially 23.3 to 46.3 centistokes, and cloud and pour points below minus 100° F.

3. A lubricant consisting of diamyl-dithio-dipropyl sulfides as a mixture of isomers; and characterized in having cloud and pour points below substantially minus 100° F.

GEORGE E. BARKER.
GEORGE E. ALTER, JR.

REFERENCES CITED

The following references are of record in the file of this patent:

UNITED STATES PATENTS

| Number | Name | Date |
| --- | --- | --- |
| 2,223,129 | Prutton | Nov. 26, 1940 |
| 2,230,966 | Reid | Feb. 4, 1941 |
| 2,261,577 | Batchelder | Nov. 4, 1941 |
| 2,339,796 | Musher | Jan. 25, 1944 |